United States Patent
Zhang et al.

(10) Patent No.: US 11,463,173 B1
(45) Date of Patent: Oct. 4, 2022

(54) SYSTEMS AND METHODS FOR WAFER-LEVEL TESTING OF TRANSMITTER-RECEIVER LINKS

(71) Applicant: Alpine Optoelectronics, Inc., Fremont, CA (US)

(72) Inventors: Xingyu Zhang, Fremont, CA (US); Dawei Zheng, Fremont, CA (US); Tongqing Wang, Fremont, CA (US); Zhoufeng Ying, Fremont, CA (US)

(*) Notice: Subject to any disclaimer, the term of this patent is extended or adjusted under 35 U.S.C. 154(b) by 0 days.

(21) Appl. No.: 17/443,381

(22) Filed: Jul. 26, 2021

(51) Int. Cl.
*H04B 10/40* (2013.01)
*G02B 6/42* (2006.01)

(52) U.S. Cl.
CPC ........ *H04B 10/40* (2013.01); *G02B 6/4204* (2013.01)

(58) Field of Classification Search
CPC .............................. H04B 10/40; G02B 6/4204
USPC ....................................................... 398/135
See application file for complete search history.

(56) References Cited

U.S. PATENT DOCUMENTS

| | | | |
|---|---|---|---|
| 2018/0227049 A1* | 8/2018 | Sahni | H04B 10/801 |
| 2020/0136728 A1* | 4/2020 | Sugiyama | G02F 1/3136 |
| 2020/0295825 A1* | 9/2020 | Sugiyama | H04B 10/0731 |
| 2021/0270699 A1* | 9/2021 | Piazza | G01M 11/0207 |

* cited by examiner

Primary Examiner — Dalzid E Singh
(74) Attorney, Agent, or Firm — Cionca IP Law P.C.; Marin Cionca (57) ABSTRACT

An integrated transceiver chip comprising: a plurality of bidirectional ports; a plurality of grating couplers; a receiver having a first and a second input ports, the first input port being optically connected to a first grating coupler of the plurality of grating couplers, and the second input port being optically connected to a first bidirectional port of the plurality of bidirectional ports; and a transmitter having a first and a second input and a first and a second output ports, the first input port being optically connected to a second bidirectional port of the plurality of bidirectional ports and the second input port being optically connected to a second grating coupler, and the first output port being optically connected to a third bidirectional port of the plurality of bidirectional ports and the second output port being optically connected to a third grating coupler of the plurality of grating couplers.

20 Claims, 4 Drawing Sheets

SYSTEMS AND METHODS FOR WAFER-LEVEL TESTING OF TRANSMITTER-RECEIVER LINKS

BACKGROUND OF INVENTION

1. Field of the Invention

The invention relates generally to integrated transceiver chips, and more specifically to wafer-level testing of transmitter to receiver links of multiple integrated transceiver chips.

2. Description of the Related Art

In recent memory, integrated photonics transceivers have become widely developed and thus deployed in high volume for use in various optical communication systems. As is known in the art, a transceiver chip may comprise a transmitter (Tx) adapted for electrical-to-optical (EO) conversion, and a receiver (Rx) adapted for optical-to-electrical (OE) conversion, for example. As an example, a transmitter, which may be realized using a Mach-Zehnder Interferometer (MZI) modulator having 1×2 couplers, requires two optical edge couplers for proper functionality, an input edge coupler (adapted to connect to a laser light source for receiving laser light) and an output edge coupler (adapted to couple the laser light out). A receiver, for example, may be realized using a single-input P-I-N-based photodetector (PD), which may require one input optical edge coupler (adapted to receive encoded laser light). Edge couplers, for example, are often utilized to achieve broadband low-loss optical input/output (I/O) in transceiver products. Moreover, transceiver chips may be provided with electrical pads disposed along the chip surface, such as along an edge of the chip, to provide electrical connections between on-chip components (e.g., Rx, Tx, etc.) and external components (e.g., drivers, transimpedance amplifiers, PCBs, etc.).

In order to ensure sufficient and/or proper functionality of a given transceiver chip, all of the components disposed on the transceiver chip must undergo a screening test before the chip is packaged into a module product, for example. Accordingly, only the transceiver chips having on-chip components that have passed the screening test will be selected for packaging, such that to substantially guarantee the product yield (and thus minimize the failure rate). The on-chip components to be tested in this case are the modulators (i.e., the Tx) and the PDs (i.e., the Rx). As an example, the screening test assesses the EO performance of the modulator, which requires coupling optical light into and out of the chip, for example, while the assessment of the OE performance of the PD requires coupling optical light into the chip. Conventionally, transceiver chips must be diced (cut) from a wafer, which comprises a plurality of transceiver chips, packaged with a laser light source through edge coupling (e.g., via lens or fiber array coupling), and then tested. Upon assessment of each of the transceiver chips, the packaged chips that show good/sufficient performance will be approved for packaging into a product. Clearly, this approach to screening is costly and time-consuming.

Recently, approaches to solving the above problems have been developed that utilize on-chip grating couplers to test the functionality of the transmitters and receivers on a wafer level, which thus negate the need for dicing the wafer into individual transceiver chips. Using such approaches, laser light can be vertically coupled into and out of each transceiver chip on the wafer through the on-chip grating couplers. As such, the above-described screening test can be performed across all the transceiver chips in a wafer one after another, which can be automated (via a computer, for example) at a single automatic testing station, for example. Using the wafer-level test results, operational/sufficient chips and nonoperational/insufficient chips may be marked and thus singled out on a wafer map modeling on the wafer, as an example. Once the wafer is diced into individual transceiver chips, only the known sufficient chips will be sent for packaging and product implementation, as an example. Thus, the use of grating couplers allows the chip screening and sorting processes to run more efficiently and cost-effectively and may also benefit the yield and quality control.

However, some of the approaches described above of on-wafer testing of integrated photonics components (e.g., Tx and Rx) require the use of additional edge couplers (aside from those already on the transceivers) and additional grating couplers disposed outside the actual transceiver chips, which thus occupies space on the wafer itself. These additional edge couplers and grating couplers are diced away and thus disposed of after the screening tests are completed, which is wasteful and thus reduces the number of transceiver chips that could be provided on the wafer. In addition, the screening tests of the transceiver chips are geared toward testing the Tx and Rx components individually, rather than as a link, for example.

Therefore, there is a need to solve the problems described above by providing a system and method for easily, efficiently, and cost-effectively testing transmitter to receiver links of integrated transceiver chips on a wafer level.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an integrated transceiver chip is provided. The integrated transceiver chip may comprise: a plurality of bidirectional ports, each bidirectional port of the plurality of bidirectional ports being aligned to an edge of the integrated transceiver chip; a plurality of grating couplers; a receiver having a first and a second input ports, the first input port being optically connected to a first grating coupler of the plurality of grating couplers, and the second input port being optically connected to a first bidirectional port of the plurality of bidirectional ports; and a transmitter having a first and a second input and a first and a second output ports, the first input port being optically connected to a second bidirectional port of the plurality of bidirectional ports and the second input port being optically connected to a second grating coupler of the plurality of grating couplers, and the first output port being optically connected to a third bidirectional port of the plurality of bidirectional ports and the second output port being optically connected to a third grating coupler of the plurality of grating couplers; wherein the receiver is adapted to receive a first optical signal being launched into one of the first grating coupler and the first bidirectional port, and the transmitter is adapted to receive a second optical signal being launched into one of the second bidirectional port and the second grating coupler, the transmitter being further adapted to cause a transmitting of the second optical signal to one of the third grating coupler and the third bidirectional port. Thus, an advantage is that on-chip transmitter and receiver components may be effectively and efficiently tested using grating couplers on the wafer level, thus reducing time consumption associated with individually testing each and every component. Another advantage of the disclosed transceiver chip is the ability to customize and rearrange the layout of the transceiver chip, such that to accommodate specific optical applications, for example, while maintaining the ability to test the Tx and Rx components on a wafer level. An additional advantage is that, because of the increased efficiency in the testing process of transceiver chips on the wafer level, cost efficiency may be increased.

In another aspect, an assembly for wafer-level testing of transmitters and receivers of integrated transceiver chips disposed on a wafer is provided. The assembly may comprise at least one coupled pair of a first and a second integrated transceiver chips, the at least one coupled pair of a first and a second integrated transceiver chips comprising: a plurality of first bidirectional ports each aligned to an edge of the first integrated transceiver chip, and a plurality of second bidirectional ports each aligned to an edge of the second integrated transceiver chip; wherein at least one first bidirectional port of the plurality of first bidirectional ports and at least one second bidirectional port of the plurality of second bidirectional ports are aligned and optically connected; a plurality of first grating couplers disposed on the first integrated transceiver chip, and a plurality of second grating couplers disposed on the second integrated transceiver chip; and a first transmitter and a first receiver disposed on the first integrated transceiver chip, and a second transmitter and a second receiver disposed on the second integrated transceiver chip; wherein one of the plurality of first grating couplers is optically connected to the first transmitter, the first transmitter being optically connected to one of the at least one first bidirectional ports aligned and optically connected to one of the at least one second bidirectional ports, the one of the at least one second bidirectional ports being optically connected to the second receiver, such that an optical link is established between the first transmitter of the first integrated transceiver chip and the second receiver of the second integrated transceiver chip. Thus, an advantage is that chip space utilization may be maximized and thus optimized on the wafer, which may increase overall product output. Another advantage is that manufacturing costs for the wafer may be reduced as a result of using solely on-chip components for conducting tests of the transceiver chip. Another advantage is that on-chip transmitter and receiver components may be effectively and efficiently tested using links on the wafer level, thus reducing time consumption associated with individually testing each and every component. An additional advantage is that, because of the increased efficiency in the testing process of transceiver chips on the wafer level, cost efficiency may be increased.

In another aspect, a method of enabling wafer-level testing of a pair of a first and a second integrated transceiver chips disposed on a wafer is provided, the pair of a first and a second integrated transceiver chips each comprising a transmitter and a receiver. The method may comprise establishing a transmitter-to-receiver link between the first and the second integrated transceiver chips, the transmitter-to-receiver link being established by: providing a plurality of bidirectional ports on each of the first and the second integrated transceiver chips, wherein at least a first and a second bidirectional ports of each of the first and the second integrated transceiver chips, respectively, are aligned and optically connected; providing a plurality of grating couplers on each of the first and the second integrated transceiver chips, wherein a first grating coupler is optically connected to a first transmitter of the first integrated transceiver chip, and a second grating coupler is optically connected to a second transmitter of the second transceiver chip; optically connecting the first transmitter to the first bidirectional port; and optically connecting a second receiver of the second integrated transceiver chip to the second bidirectional port, such that to establish a transmitter-to-receiver link between the first transmitter and the second receiver, the transmitter-to-receiver link enabling wafer-level testing of the first and the second transceiver chips. Thus, an advantage of the disclosed method is that costs associated with purchasing and implementing external optical testing components may be greatly reduced. Another advantage is that on-chip transmitter and receiver components may be effectively and efficiently tested using links on the wafer level, thus reducing time consumption associated with individually testing each and every component. An additional advantage of the disclosed method is that wafer-level testing may be efficiently conducted for pairs of transceivers having only one pair of directly connected edge couplers. An additional advantage is that, because of the increased efficiency in the testing process of transceiver chips on the wafer level, cost efficiency may be increased.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 101 and 201A, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 1:
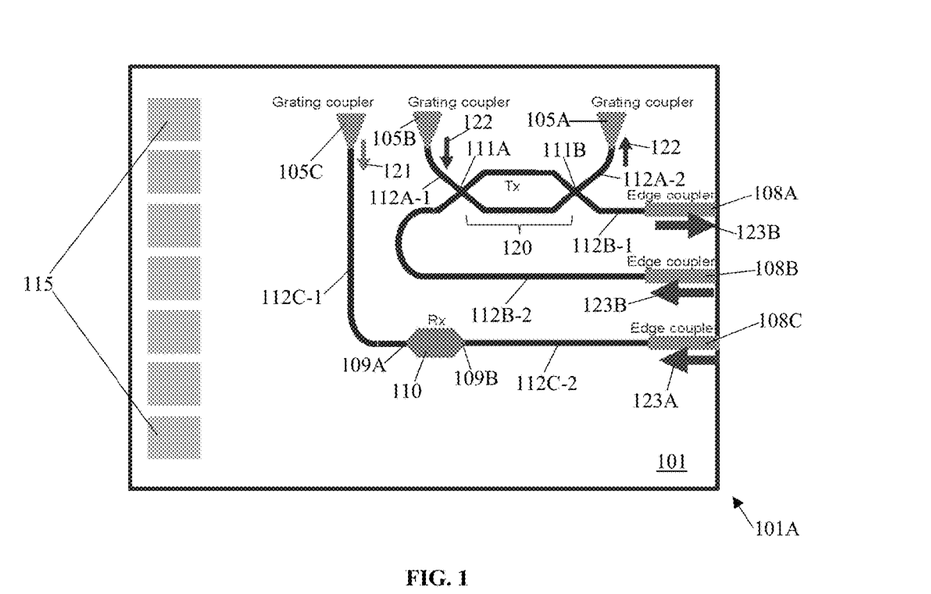
FIG. 1 is a diagram illustrating a top view of an integrated transceiver chip, according to an aspect.

FIG. 1 is a diagram illustrating a top view of an integrated transceiver chip 101, according to an aspect. As described previously in the Background above, the integrated transceiver chip ("integrated transceiver chip," "transceiver chip," "chip") 101 may be provided with an MZI modulator-based transmitter 120, labeled Tx, for example, and a P-I-N photodetector-based receiver 110, labeled Rx, as shown. It should be understood that the on-chip transmitter and receiver may be realized using additional/alternative optical components known in the art, for example. As shown, the integrated transceiver chip 101 may be provided with an array of electrical pads 115 aligned to a side of the chip, for example, for providing an electrical connection (not shown) to the Tx and Rx components and external electrical components (not shown). It should be understood that the array of electrical pads 115 may be deposited on the chip 101 in other locations, for example. As will be described in detail throughout this disclosure below, the arrangement of the Tx and Rx components on the integrated transceiver chip 101 may enable the formation of transmitter to receiver ("transmitter-receiver") links within a wafer, which may thus allow the easy and efficient wafer-level testing of the transmitter-receiver links, as well as the Tx and Rx components individually themselves.

As shown in FIG. 1, the integrated transceiver chip 101 may comprise a plurality of bidirectional ports aligned to an edge of the transceiver chip 101. As an example, the bidirectional ports may be provided as three edge couplers 108A-108C, as shown, which may be aligned to a first edge/side 101A of the transceiver chip 101. As shown, the first edge coupler 108A may be optically connected (via optical channel 112B-1, for example) to the transmitter output 111B, the second edge coupler 108B may be optically connected (via optical channel 112B-2, for example) to the transmitter input 111A, and the third edge coupler 108C may be optically connected to the receiver 110 (via optical channel 112C-2, for example). As illustrated, each edge coupler may be adapted to receive and/or transmit optical light, depending on the direction of light propagation, for example. For example, as shown, the first edge coupler 108A may be adapted to transmit the optical signal 123B being input through the second edge coupler 108B, for example, and the third edge coupler may be adapted to receive the optical signal 123A. As will be described in more detail below when referring to FIG. 2, the edge-aligned plurality of bidirectional ports (e.g., edge couplers 108A-108C) may enable the formation of transmitter-receiver links between two adjacent transceiver chips for the wafer-level testing of said transmitter-receiver links.

As an example, the input 111A and output 111B of the transmitter 120 may each be 2×2 couplers, as shown in FIG. 1. As mentioned previously in the Background above, traditional MZI modulator-based transmitters conventionally comprise 1×2 coupler inputs and outputs. As shown, the 2×2 coupler input 111A and output 111B allow the Tx 120 to essentially have two inputs and two outputs, as needed. As shown as an example, the input 2×2 coupler 111A may optically connect (via optical channel 112B-2, for example) to the second edge coupler 108B, as mentioned above, and to a grating coupler 105B (via optical channel 112A-1, for example). Similarly, as shown, the output 2×2 coupler 111B may optically connect (via optical channel 112B-1, for example) to the first edge coupler 108A and to a grating coupler 105A (via optical channel 112A-2, for example). As shown in FIG. 1, the transceiver chip 101 may be provided with a plurality of grating couplers 105A-105C for coupling optical light into or out of the chip 101. As an example, the receiver 110 may also optically connect (via optical channel 112C-1, for example) to a grating coupler 105C. As an example, optical light from an external laser can be coupled into and/or out of the MZI modulator transmitter 120 vertically or at an angle, for example, via the grating couplers 105A-105C. As will be discussed in more detail below, the grating couplers 105A-105C may be configured to receive and/or transmit optical signals ("optical signals," "optical test signals") 121 and 122 for screening the optical-to-electrical (OE) conversion performance of the receiver 110 and electrical-to-optical (EO) conversion performance of the transmitter 120. Each of the grating couplers is bidirectional, so it should be understood that the direction of light propagation indicated by the arrows 121 and 122 may be reversed.

As mentioned previously in the Background above, traditional PD-based receivers conventionally comprise a single input for receiving light from a single direction. As an example, the PD-based receiver 110 may be configured to have two input ports 109A and 109B, as mentioned previously above, being optically connected to the third grating coupler 105C and the third edge coupler 108C, respectively, as shown. As such, optical light 121 or 123A from an external laser can be coupled into the receiver inputs 109A and 109B through the grating coupler 105C or the edge coupler 108C, respectively. As mentioned above, in this way, the Tx 120 and the Rx 110 of the transceiver chip 101 can be tested via the grating couplers 105A-105C, without the need for first being diced out of a wafer. Moreover, because the grating couplers 105A-105C are disposed within the transceiver chip 101 itself, rather than outside the transceiver chip 101 on the wafer (not shown), the requirement for extra space outside the transceiver chip is negated. Thus, an advantage is that chip space utilization may be maximized and thus optimized on the wafer, which may increase overall product output. Another advantage is that manufacturing costs for the wafer may be reduced as a result of using solely on-chip components for conducting tests of the transceiver chip. As will be described in detail below, the transceiver chip 101 shown in FIG. 1 may be paired with a second transceiver chip for forming a transmitter-receiver link, as an example.

Figure 2:
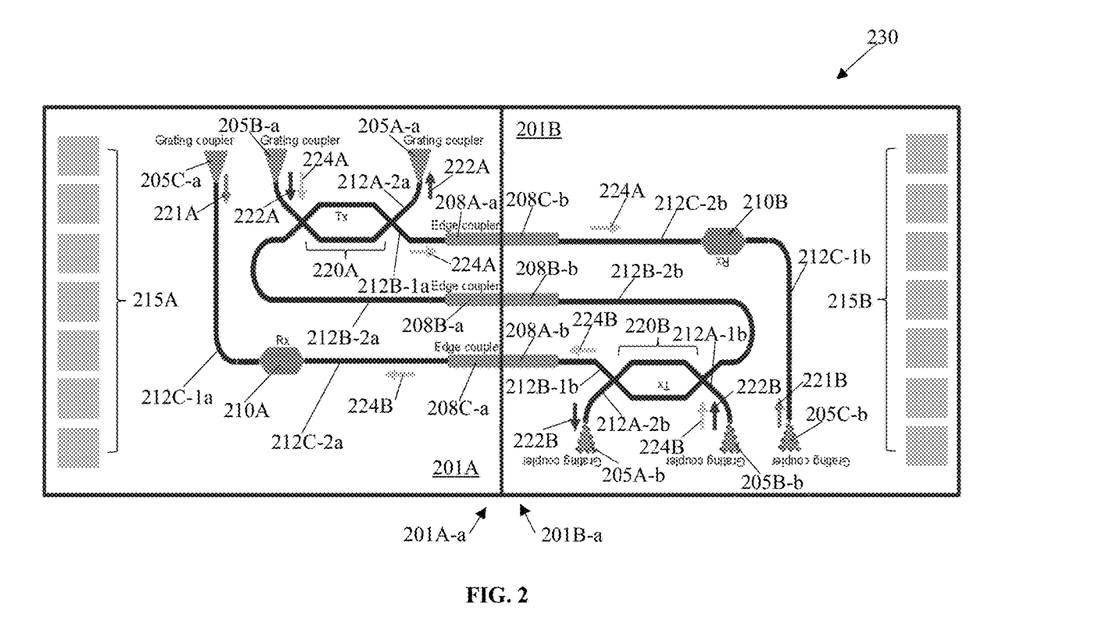
FIG. 2 is a diagram illustrating a top view of an exemplary layout for testing a transmitter-receiver link between a coupled pair of the integrated transceiver chip of FIG. 1, according to an aspect.

FIG. 2 is a diagram illustrating a top view of an exemplary layout for testing a transmitter-receiver link 230 between a coupled pair of the integrated transceiver chip 101 of FIG. 1, according to an aspect. As mentioned previously above, the transceiver chip 101 shown in FIG. 1 may be contained within a wafer and arranged such that to form a transmitter-receiver link with a second transceiver chip having the same or substantially the same optical components as the transceiver chip 101. For example, each transceiver chip 201A, 201B may comprise electrical connection pads 215A, 215B, a plurality of grating couplers, a plurality of edge couplers, a receiver 210A, 210B, and a transmitter 220A, 220B. As will be discussed in detail below, the pair of transceiver chips 201A and 201B shown in FIG. 2 may be thus arranged such that to enable wafer-level testing of the Tx and Rx components of the pair, as an example.

As an example, let the first and the second transceiver chips 201A and 201B, respectively, be contained within a wafer (not shown) and be arranged as shown in FIG. 2. It should be understood that the first and the second transceiver chips 201A and 201B may be thus arranged during the manufacturing/printing of the chips onto the wafer (not shown). As shown in FIG. 2, the pair of transceiver chips 201A and 201B may be arranged back-to-back, such that the second chip 201B is rotated by 180 degrees relative to the first chip 201A, as an example. As such, the first ends 201A-a and 201B-a of the first and the second transceiver chips 201A and 201B, respectively, may be abutted, such that their respective edge couplers are aligned. As shown, the edge couplers 208A-a-208C-a of the first chip 201A may be directly connected to the edge couplers 208C-b-208A-b of the second chip 201B, respectively, such that optical light can pass bidirectionally from one chip to the other via these connections, for example. More specifically, the direct connections between the chips' respective edge couplers create an optical path between their respective transmitters and receivers. For example, because of the connection between the edge couplers 208A-a and 208C-b, the output (e.g., 111B in FIG. 1) of the transmitter 220A of the first chip 201A is now optically connected to the second input port (e.g., 109B in FIG. 1) of the receiver 210B of the second chip 201B (via optical channels 212B-1a and 212C-2b, respectively, for example). Similarly, the second input port of the receiver 210A of the first chip 201A is optically connected to the output of the transmitter 220B of the second chip 201B because of the connection between the edge couplers 208C-a and 208A-b, for example, (via optical channels 212C-2a and 212B-1b, respectively, for example). Thus, two back-to-back transmitter-receiver links 230 are formed between the two transceiver chips 201A and 201B, as shown.

As mentioned previously above in the Background, the Tx and Rx components are typically screened for EO and OE conversion performances, respectively, to single out sufficient and insufficient transceiver chips on a wafer before dicing and subsequent product packaging. As described previously, the Tx and Rx components on each chip of the wafer are tested individually, which can be time consuming, even when the testing process is automated. However, the transmitter-receiver link 230 between each pair of coupled transceiver chips can be tested, for example, which tests two (or more) Tx and Rx components in parallel simultaneously, rather than each component individually one at a time. As will be discussed in detail below, the disclosed layout of the transceiver chips 201A and 201B shown in FIG. 2 allows the Tx or Rx on each chip to be tested individually on the wafer, if desired, while also allowing the two Tx-Rx links to be tested for each pair of chips.

In accordance with an aspect of the current invention, a method of testing the transmitter-receiver link 230 between the first and the second transceiver chips 201A and 201B on a wafer level is provided. As mentioned above, the method may also involve testing the Tx and Rx components of each chip individually, if desired, as an example. For example, each Tx of each chip can be tested by launching laser light into the grating coupler optically connected to the input of the Tx. As an example, to test the transmitter 220A of the first transceiver chip 201A, a first optical test signal 222A can be launched into the grating coupler 205B-a, as shown in FIG. 2. The first optical signal 222A will pass through the transmitter 220A and be subsequently coupled out of the grating coupler 205A-a, as shown, via optical channel 212A-2a, for example. As an example, an electrical signal is applied onto the Tx 220A to initiate EO conversion, for example, via a portion of the electrical pads 215A, which may be electrically connected to the Tx 220A (via connections not shown). The optical light collected at the output of the grating coupler 205A-a may provide feedback (to a user or external computer, for example) regarding the EO conversion performance of the transmitter 220A. The same is true for testing the transmitter 220B of the second transceiver chip 201B, as an example, which is achieved by launching optical test signal 222B into the grating coupler 205B-b and collecting the outputted light at grating coupler 205A-b.

As shown in FIG. 2, continuing the method outlined above, the receivers Rx of each chip can be tested as follows. An optical test signal 221A may be launched into the grating coupler 205C-a and propagate along optical channel 212C-1a toward the receiver 210A, as an example. The received optical test signal 221A may be converted to an electrical signal, which is then sent to a portion of the electrical pads 215A, for example, such that the electrical signal can be collected as feedback (to a user or external computer, for example) to evaluate the OE conversion performance of the receiver 210A. The same is true for testing the receiver 210B of the second transceiver chip 201B, which can be achieved by launching optical test signal 221B into the grating coupler 205C-b and evaluating its OE conversion performance via a portion of the electrical pads 215B, for example. Finally, the two back-to-back transmitter-receiver links 230 can be tested, as an example. As shown, in order to test the first Tx-Rx link, optical test signal 224A may be launched into the grating coupler 205B-a and be propagated through the transmitter 220A of the first transceiver chip 201A, as an example. The optical signal 224A may then propagate through the connected edge couplers 208A-a and 208C-b (via optical channel 212B-1a), as shown, and propagate along optical channel 212C-2b toward the receiver 210B of the second transceiver chip 201B. The receiver 210B may receive the optical test signal 224A, thus completing the test of the first Tx-Rx link. The testing of the second Tx-Rx link may follow in a similar manner. As shown as an example, optical test signal 224B may be launched into the grating coupler 205B-b and be propagated through the transmitter 220B of the second transceiver chip 201B, as an example. The optical test signal 224B may then propagate through the connected edge couplers 208A-b and 208C-a (via optical channel 212B-1b), as shown, and propagate along optical channel 212C-2a toward the receiver 210A of the first transceiver chip 201A. The receiver 210A may receive the optical signal 224B, thus completing the test of the second Tx-Rx link, and thus completing the testing of the two back-to-back (i.e., in both directions) Tx-Rx links 230.

As mentioned above previously in the Background, the sufficiency of the performances of the transmitters and receivers may be tracked using a wafer map (not shown) corresponding to the layout of transceiver chips (e.g., 201A and 201B) on a wafer, for example. In each of the above tests, phase shifters (not shown) on each MZI modulator of the transmitters 220A and 220B will be tunable, for example, such that to allow light to pass through to a particular desired output port. For example, referring to the transmitter 220A, the phase shifter (not shown) will direct optical signal 222A to travel along 212A-1a toward grating coupler 205A-a, as shown, and will direct optical signal 224A to travel toward edge coupler 208A-a via 212B-1a, as shown. As an example, the above-described wafer-level tests of the Tx and Rx components may be carried out not only via DC tests, but also via high-speed performance tests, such as S parameter measurements. Additionally, the high-speed performance of the Tx-Rx link can be tested on the wafer level.

As an example, once the high-speed performance of the Tx (or Rx) is known after individual test of Tx (or Rx), the result can be used to test the Rx (or Tx) on the nearby chips. Conventionally, one has to purchase an external high-speed photodetector (PD) to test the on-chip Tx, and to purchase an external high-speed modulator to test the on-chip Rx, respectively, which are expensive instruments. However, one only needs to purchase an external high-speed PD to test the on-chip Tx, because the on-chip Rx can be tested using the on-chip Rx (due to the disclosed Tx-Rx link, for example), negating the need for purchasing an external high-speed modulator. The reverse is also true, such that one may purchase a high-speed modulator to test the on-chip Rx without having to also purchase an external high-speed PD to then test the on-chip Tx, for example. Thus, the conventional use of external high-speed receivers (or transmitters) for conducting the high-speed performance test, which is costly and inconvenient, may be negated. Thus, an advantage of the disclosed method is that costs associated with purchasing and implementing external optical testing components may be greatly reduced. Another advantage is that on-chip transmitter and receiver components may be effectively and efficiently tested using links on the wafer level, thus reducing time consumption associated with individually testing each and every component.

Figure 3:
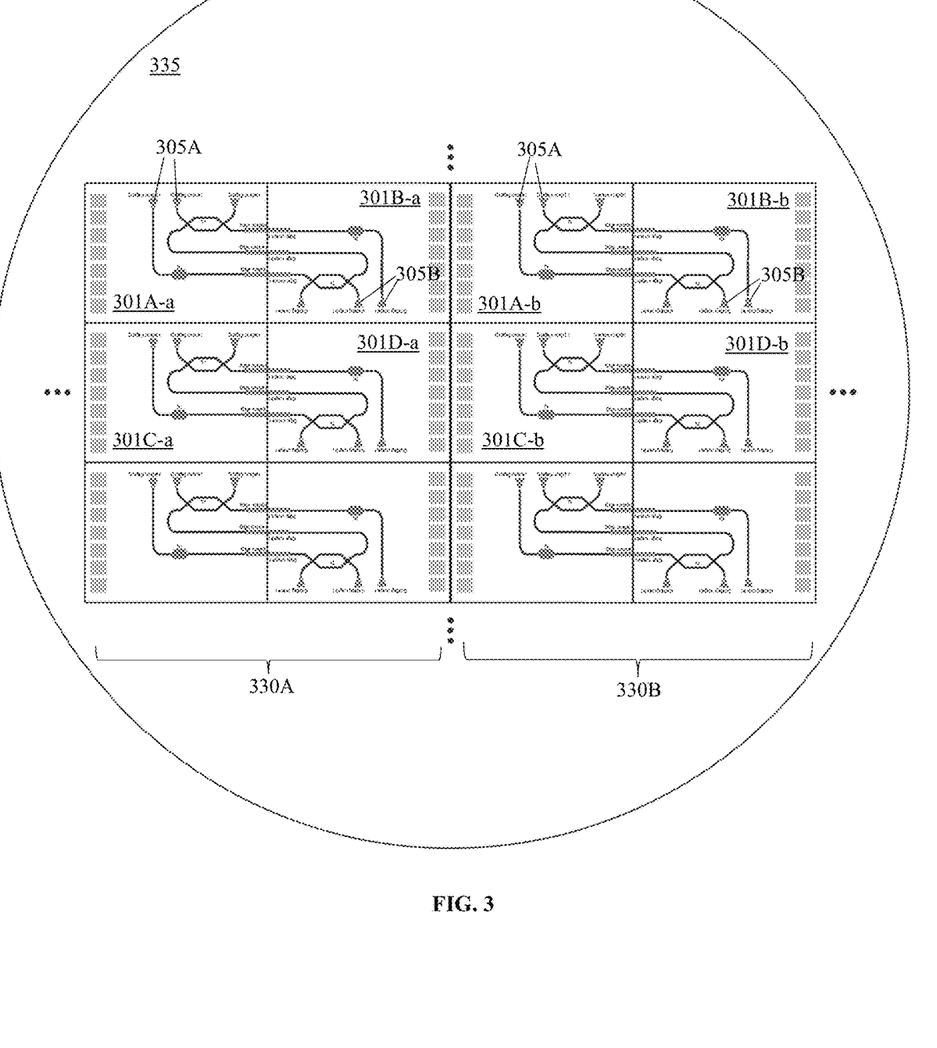
FIG. 3 is a diagram illustrating a top view of a wafer comprising a plurality of the coupled pairs of integrated transceiver chips of FIG. 2, according to an aspect.

FIG. 3 is a diagram illustrating a top view of a wafer 335 comprising a plurality of the coupled pair of integrated transceiver chips 201A and 201B of FIG. 2, according to an aspect. As mentioned throughout this disclosure above, integrated transceiver chips may be manufactured on, and thus contained in, a wafer, which may comprise a plurality of identical (or unidentical) integrated transceiver chips. As also mentioned previously above, the transmitter and receiver components of each integrated transceiver chip needs to be screened for performance evaluation prior to wafer dicing and subsequent product packaging. As will be discussed in detail below, the wafer 335 may comprise a plurality of coupled pairs of integrated transceiver chips, such that all transmitter and receiver components across the wafer 335 may be screened and tested using the Tx-Rx link approach discussed previously when referring to FIG. 2.

As shown in FIG. 3, a plurality of the pairs of transceiver chips 201A and 201B of FIG. 2 may be provided in the wafer 335, with each transceiver chip being provided with a connected adjacent transceiver chip, for example. As similarly described previously above when referring to FIG. 2, each pair of transceiver chips (e.g., 301A-a and 301B-a, 301C-b and 301D-b, etc.) may be optically connected via their respective aligned edge couplers (e.g., 208A-a and 208C-b in FIG. 2). As such, each pair of transceiver chips forms a transmitter-receiver link (e.g., 230 in FIG. 2) between them, such that a plurality of transmitter-receiver links 330A, 330B are formed across the wafer 335, as an example. When testing the plurality of pairs of transceiver chips across the wafer 335, a laser light source may be used to test each transmitter-receiver link 330A or 330B between connected pairs of transceiver chips. As shown, across the wafer 335, the grating couplers 305A of each left chip (e.g., 301A-a, 301C-a, 301A-b, 301C-b) oppositely face the grating couplers 305B of each right chip (e.g., 301B-a, 301D-a, 301B-b, 301D-b), by a difference of 180 degrees. As such, each of the grating couplers 305A and 305B may be configured for vertical coupling (coupling incident light perpendicular to the wafer surface), such that all of the grating couplers across the wafer 335 are identical. Therefore, when switching from testing one transceiver chip (301C-a) of a paired Tx-Rx link (e.g., 330A) to the other chip (e.g., 301D-a), the fibers (not shown) coupling the optical light into or out of the wafer that receive/emit light do not have to be rotated by 180 degrees. Thus, any inconvenience associated with rotating the fiber-coupled laser source may be avoided, as an added advantage.

It should be understood that the number of integrated transceiver chips provided on the wafer 335 may be as large or as small as desired, save that each transceiver chip is optically paired with a neighboring transceiver chip. It should also be understood that the orientation of the individual pairs of transceiver chips in the wafer may not all be identical, as shown in FIG. 3. It should also be understood that the method of testing each pair of transceiver chips disposed in the wafer 335 follows the method outlined previously above when referring to FIG. 2. As mentioned above, the grating couplers 305A and 305B can be specifically adapted for vertical coupling, such that to avoid having to rotate the wafer (or the light source) by 180 degrees to switch from one chip to the other. While efficient, the grating couplers designed for vertical coupling may cause some undesired effects, such as lower coupling efficiency or higher optical reflection. As an alternative approach to solving this problem, alternative embodiments of the transceiver chip may be provided, such that alternative layouts of pairs of transceiver chips are provided as well, as will be described in detail throughout this disclosure below.

Figure 4:
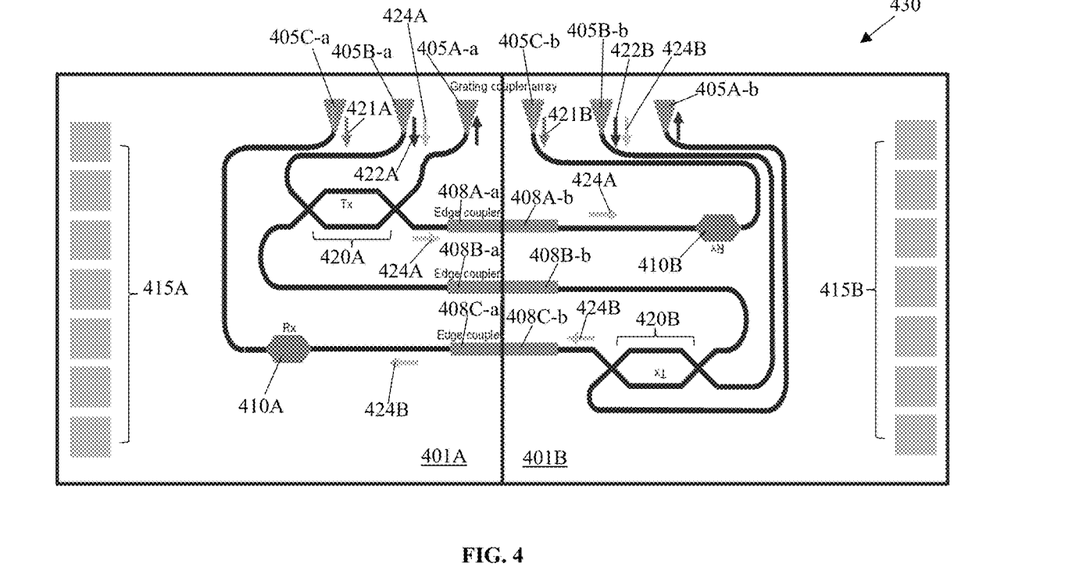
FIG. 4 is a diagram illustrating a top view of an exemplary layout for testing a transmitter-receiver link between a coupled pair of alternative embodiments of the integrated transceiver chip of FIG. 1, according to an aspect.

FIG. 4 is a diagram illustrating a top view of an exemplary layout for testing a transmitter-receiver link 430 between a coupled pair of alternative embodiments 401A and 401B of the integrated transceiver chip 101 of FIG. 1, according to an aspect. As mentioned above, the transceiver chip shown previously in FIG. 1 may be provided in an alternative embodiment, such that a pair of the alternative embodiments may form an alternative layout for the transmitter-receiver link (230) shown previously in FIG. 2, for example. As will be discussed in detail below, the second embodiment of the transceiver chip shown in FIG. 4 may still allow the wafer-level testing of the Tx and Rx components, as well as the testing of back-to-back Tx-Rx links, between pairs of the second embodiment, as an example.

As shown in FIG. 4, referring to a first and a second transceiver chips 401A and 401B, the grating couplers (e.g., 405C-a, 405A-b) of each transceiver chip may be arranged to face a same direction, such that the grating couplers are disposed near a same edge of the transceiver chips. As an example, the grating couplers 405A-a-405C-a of the first transceiver chip 401A may be provided near the top edge of the transceiver chip 401A. As shown, the grating couplers 405A-b-405C-b may be provided near a same top edge of the transceiver chip 401B, such that the grating couplers of both transceiver chips 401A and 401B form a grating coupler array, as indicated. As similarly described previously above when referring to FIG. 2, the first and the second transceiver chips 401A and 401B may be directly connected via their respective aligned edge couplers, such that three bidirectional optical paths are created between the first and the second transceiver chips 401A and 401B, as an example. In this way, the transmitter 420A of the first transceiver chip 401A may be optically connected to the receiver 410B of the second transceiver chip 401B via the connected edge couplers 408A-a and 408A-b, as shown, and the transmitter 420B of the second transceiver chip 401B may be optically connected to the receiver 410A of the first transceiver chip 401A via the connected edge couplers 408C-b and 408C-a, as shown as an example. Thus, the optically connected transmitters 420A and 420B and receivers 410A and 410B, respectively, may form a back-to-back transmitter-receiver link 430 between the first and the second transceiver chips 401A and 401B.

As similarly described throughout this disclosure above, the Tx and/or the Rx components of the first and the second transceiver chips 401A and 401B may be tested individually, and the back-to-back links between the Tx and Rx components on the wafer level may then be tested using the grating coupler array shown in FIG. 4, for example. It should be understood that at least one Tx or Rx needs to be tested individually to evaluate the EO or OE conversion performance, respectively of the at least one Tx or Rx. Then, following the testing of the Tx-Rx links, in the manner described previously above, the Rx or Tx performance (i.e., the performance of the component that was not individually tested) may be extracted via the Tx-Rx link tests, as an example. As described similarly above, in order to test the transmitter 420A of the first transceiver chip 401A, optical test signal 422A may be launched into grating coupler 405B-a and may subsequently be coupled out of the grating coupler 405A-a to be collected for EO conversion evaluation, for example. Then, in order to test the receiver 410A of the first transceiver chip 401A, optical test signal 421A may be launched into grating coupler 405C-a to be received by the receiver 410A, and thus to evaluate the OE conversion performance of the receiver 410A, for example. Finally, to test the Tx-Rx link between the first transceiver chip 401A and the second transceiver chip 401B, optical test signal 424A may be launched into grating coupler 405B-a and may be propagated through the transmitter 420A and subsequently through the connected edge couplers 408A-a and 408A-b, as shown, to be received by the receiver 410B, as an example. As mentioned previously above when referring to FIG. 2, the reading of the performances of the transmitter 420A and the receivers 410A and 410B may be accomplished via on-chip electrical connections (via electrical pads 415A or 415B, for example) electrically connected to an external computer, for example.

Following the test of the first transceiver chip 401A, the second transceiver chip 401B may be tested following the same protocol as set forth above. Because the grating couplers 405A-b-405C-b of the second transceiver chip 401B are arranged on the same side and are faced in the same direction as those of the first transceiver chip 401A, when switching the screening test from the first transceiver chip 401A to the second transceiver chip 401B, there is no need to rotate the wafer (on which the chips are disposed) by 180 degrees or change the incidence angles of the laser-connected fiber (array). The fibers or fiber arrays optically aligned with the test laser source may thus simply be traversed longitudinally such that to align with the grating couplers 405A-b-405C-b, as needed, to conduct the screening tests of the Tx and Rx components and link for the second transceiver chip 401B, for example. Accordingly, the transmitter 420B may be tested via optical test signal 422B being launched into grating coupler 405B-b, the receiver 410B may be tested via optical test signal 421B being launched into grating coupler 405C-b, and finally, the Tx-Rx link between the second and the first transceiver chips 401B and 401A may be tested via optical test signal 424B being launched into grating coupler 405B-b, as shown. Thus, the optical alignment process for the fiber/fiber array (not shown) when testing the coupled pair of transceiver chips 401A and 401B, as well as each coupled pair of transceiver chips on the wafer (not shown), may be simplified due to the use of the grating coupler array layout shown in FIG. 4. Thus, an advantage of the use of the grating coupler array layout is the ease of optical alignment during testing since there is no need for rotating the wafer when switching between a pair of coupled transceiver chips.

It should be understood that the coupled pair of the second embodiment of the transceiver chip disclosed herein may be provided as a plurality disposed across a wafer, as shown previously in FIG. 3. As such, each coupled pair of the second embodiment of the transceiver chip may be tested on the wafer in the manner described above using the grating coupler array of each coupled pair of transceiver chips, for example. As such, those integrated transceiver chips having nonoperational/insufficient Tx or Rx components, as determined during wafer-level testing, will not be approved for product packaging after wafer dicing, as an example. It should also be understood that any mention of fibers or fiber arrays in association with the testing process includes the laser source from which the optical test signals originate. It should also be understood that the grating couplers described above do not have to be configured for vertical coupling. As an example, the gratin couplers can be alternatively configured to couple light entering at an angle smaller than 90 degrees, for example, such that to enable the optimization of grating coupler performance in terms of optical loss and reflection, for example.

Figure 5:
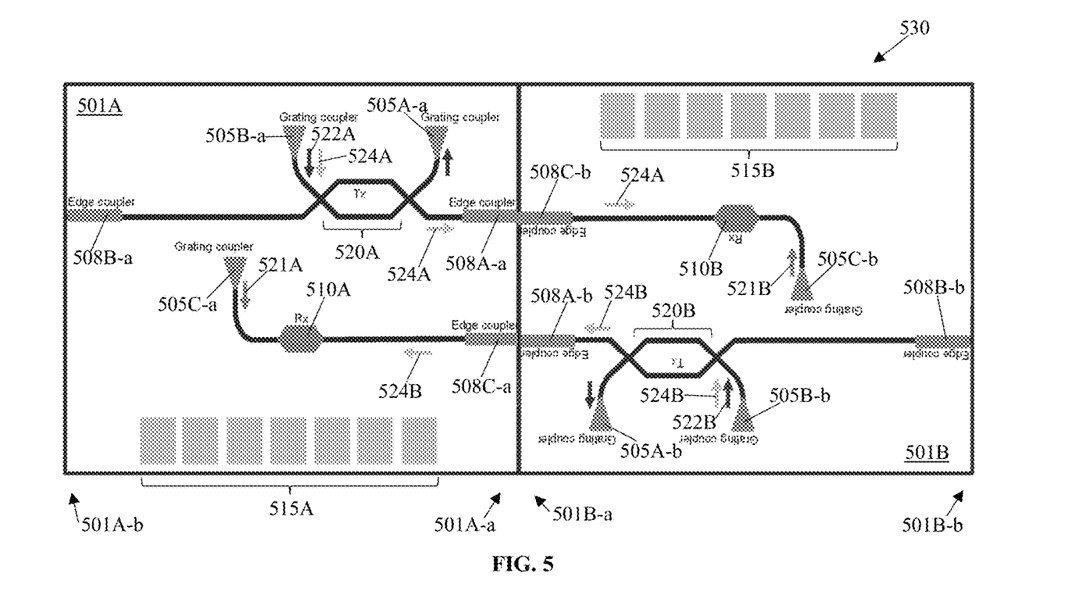
FIG. 5 is a diagram illustrating a top view of an exemplary layout for testing a transmitter-receiver link between a coupled pair of alternative embodiments of the integrated transceiver chip, according to an aspect.

FIG. 5 is a diagram illustrating a top view of an exemplary layout for testing a transmitter-receiver link 530 between a coupled pair of alternative embodiments 501A and 501B of the integrated transceiver chip, according to an aspect. As mentioned previously above, the transceiver chip shown previously in FIG. 1 may be provided in a third alternative embodiment, such that a pair of the alternative embodiments may form an alternative layout for the transmitter-receiver link shown previously in FIG. 2, for example. As will be discussed in detail below, the third embodiment of the transceiver chip shown in FIG. 5 may still allow the wafer-level testing of the Tx and Rx components, as well as the testing of back-to-back Tx-Rx links, between pairs of the third embodiment, as an example.

As shown in FIG. 5, referring to a first and a second transceiver chips 501A and 501B, the edge couplers of each transceiver chip may be alternatively arranged, in comparison to the previous embodiments shown herein (in FIGS. 3 and 4, for example), for example, such that a location of the edge couplers (e.g., 508A-a, 508B-a) of each transceiver chip may not have to be on the same edge of the chip. As an example, the edge couplers 508A-a and 508C-a of the first transceiver chip 501A may be provided at a first end 501A-a, as previously shown for the other embodiments. However, the edge coupler 508B-a, as shown, may be provided at a second end 501A-b of the first transceiver chip 501A, such that the edge couplers are now positioned on two edges of the chip 501A. Similarly, as shown, the edge couplers 508A-b and 508C-b of the second transceiver chip 501B may be provided at a same first end 501B-a, such that the aligned edge couplers 508A-a and 508C-a, and 508C-b and 508A-b, of the transceiver chips 501A and 501B, respectively, maintain their direct alignment. As above, the edge coupler 508B-b of the second transceiver chip 501B may be aligned to an opposite second end 501B-b, as shown. As shown, the first and the second transceiver chips 501A and 501B may be directly connected via their respective aligned edge couplers, such that two bidirectional optical paths are created between the first and the second transceiver chips 501A and 501B, as an example. As such, the transmitter 520A of the first transceiver chip 501A may be optically connected to the receiver 510B of the second transceiver chip 501B via the connected edge couplers 508A-a and 508C-b, as shown, and the transmitter 520B of the second transceiver chip 501B may be optically connected to the receiver 510A of the first transceiver chip 510A via the connected edge couplers 508C-a and 508A-b, as shown as an example. Thus, the optically connected transmitters 520A and 520B and receivers 510A and 510B, respectively, may form a back-to-back transmitter-receiver link 530 between the first and the second transceiver chips 501A and 501B.

As similarly described throughout this disclosure above, the Tx and the Rx components of the first and the second transceiver chips 501A and 501B may be tested individually and/or via the back-to-back links between the Tx and Rx components on the wafer level using the grating couplers shown in FIG. 5, for example. As described similarly above, in order to test the transmitter 520A of the first transceiver chip 501A, optical test signal 522A may be launched into grating coupler 505B-a and may subsequently be coupled out of the grating coupler 505A-a for EO conversion evaluation, for example. Then, in order to test the receiver 510A of the first transceiver chip 501A, optical test signal 521A may be launched into grating coupler 505C-a to be received by the receiver 510A, and thus to evaluate the OE conversion performance of the receiver 510A, for example. Finally, to test the Tx-Rx link between the first transceiver chip 501A and the second transceiver chip 501B, optical test signal 524A may be launched into grating coupler 505B-a and may be propagated through the transmitter 520A and subsequently through the connected edge couplers 508A-a and 508C-b, as shown, to be received by the receiver 510B, as an example. As mentioned previously above when referring to FIG. 2, the reading of the performances of the transmitter 520A and the receivers 510A and 510B may be accomplished via on-chip electrical connections (via electrical pads 515A or 515B, for example) electrically connected to an external computer, for example.

Following the test of the first transceiver chip 501A, the second transceiver chip 501B may be tested following the same protocol as set forth above. Because the grating couplers on the two chips are facing opposite directions, when switching the screening test from the first transceiver chip 501A to the second transceiver chip 501B, the wafer (on which the chips are disposed) will need to be rotated by 180 degrees or the incidence angles of the laser-connected fiber (array) will need to be changed. As similarly mentioned previously above when referring to FIG. 3, because each chip's respective grating couplers are facing in opposite directions, as shown, the fibers or fiber arrays optically aligned with the test laser sources cannot thus simply be traversed longitudinally such that to align with the grating couplers 505A-b-505C-b, as needed, to conduct the screening tests of the Tx and Rx components and link for the second transceiver chip 501B, for example. It should be understood that, to solve such a problem, the grating couplers may be arranged to face in the same direction, such as in the layout shown previously in FIG. 4, for example.

Upon alignment of the fibers or fiber arrays to the grating couplers 505A-b-505C-b of the second transmitter chip 501B, the transmitter 520B may be tested via optical test signal 522B being launched into grating coupler 505B-b, the receiver 510B may be tested via optical test signal 521B being launched into grating coupler 505C-b, and finally, the Tx-Rx link between the second and the first transceiver chips 501B and 501A may be tested via optical test signal 524B being launched into grating coupler 505B-b, as shown. Thus, an advantage of the disclosed method is that wafer-level testing may be efficiently conducted for pairs of transceivers having only two pairs of directly connected edge couplers. As stated above, the fiber/fiber array optical alignment process for the third embodiment of the transceiver chip when testing the coupled pair of transceiver chips 501A and 501B, as well as each coupled pair of transceiver chips on the wafer (not shown), may be more complicated than that shown previously and described above when referring to FIG. 4. However, as will be described in detail later when referring to FIG. 6, the pairs of the third embodiment of the transceiver chip shown in FIG. 5 may be modified and thus reoriented, such that to enable the grating couplers to be aligned to face in the same direction once again. In addition, the electrical pads (515A, 515B) can be arranged in different locations, such as those shown previously in the layout of FIG. 4, for example.

It should be understood that the coupled pair of the third embodiment of the transceiver chip disclosed herein may be provided as a plurality disposed across a wafer, as shown previously in FIG. 3. As such, each coupled pair of the third embodiment of the transceiver chip may be tested on the wafer in the manner described above using the grating couplers of each coupled pair of transceiver chips, for example. As such, those integrated transceiver chips having nonoperational/insufficient Tx or Rx components, as determined during wafer-level testing, will not be approved for product packaging after wafer dicing, as an example.

Figure 6:
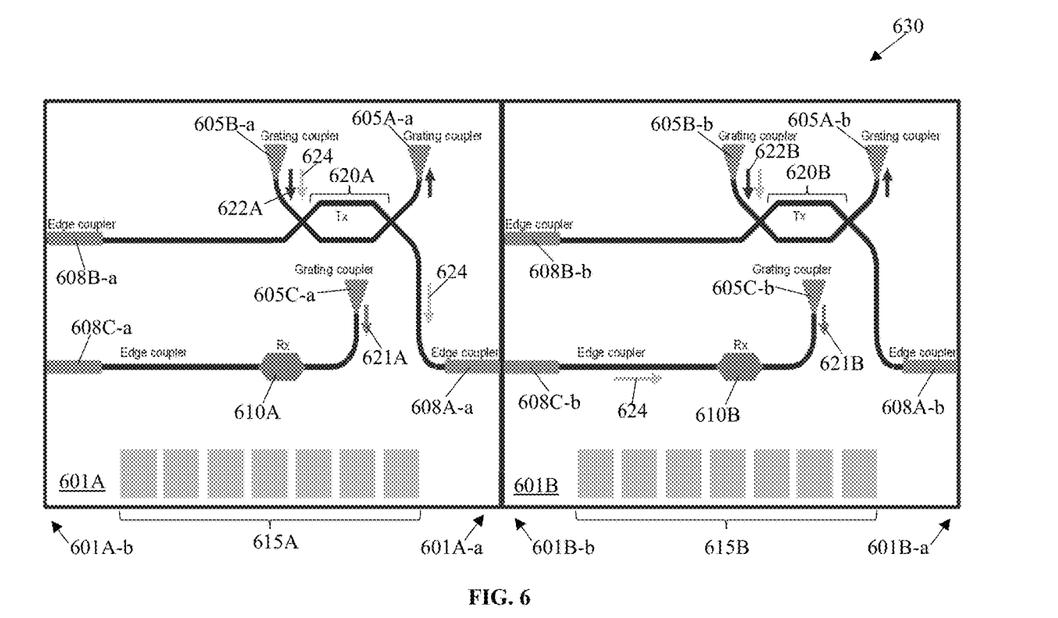
FIG. 6 is a diagram illustrating a top view of an exemplary layout for testing a transmitter-receiver link between a coupled pair of alternative embodiments of the integrated transceiver chip, according to an aspect.

FIG. 6 is a diagram illustrating a top view of a method of testing a transmitter-receiver link 630 between a coupled pair of alternative embodiments 601A and 601B of the integrated transceiver chip, according to an aspect. As mentioned previously above, the transceiver chip shown previously in FIG. 1 may be provided in an alternative embodiment, such that a pair of the alternative embodiments may form an alternative layout for the transmitter-receiver link shown previously in FIG. 2, for example. As will be discussed in detail below, the third embodiment of the transceiver chip shown previously in FIG. 5 may be alternatively formatted as a fourth embodiment and paired with another chip, such that to allow an easier wafer-level testing of the Tx and Rx components, as well as the testing of back-to-back Tx-Rx links, between pairs of the fourth embodiment, as an example.

As shown in FIG. 6, referring to a first and a second transceiver chips 601A and 601B, in comparison to the pairing shown previously in FIG. 5, the first and the second transceiver chips 601A and 601B have been rearranged, for example. As an example, the edge couplers of each transceiver chip may again be alternatively arranged, such that the Tx output and the Rx input are on opposite sides of the chip, rather than being located on the same side of the chip, as described previously above when referring to FIG. 5. As an example, the edge coupler 608C-a optically connected to the receiver 610A may be provided at a second end 601A-b of the first transceiver chip 601A, such that only the edge coupler 608A-a of the first transceiver chip 601A is provided at a first end 601A-a, as opposed to the embodiments previously shown herein. Additionally, the edge coupler 608B-a connected to the input of the transmitter 620A, as shown, may be provided at the second end 601A-b of the first transceiver chip 601A, such that the edge couplers are again arranged on two sides of the chip 601A. Similarly, as shown, the edge couplers 608B-b and 608C-b of the second transceiver chip 601B may be provided at a same second end 601B-a, such that the first and the second transceiver chip 601A and 601B are identical in layout and orientation, as shown. As above, the edge coupler 608A-b optically connected to the receiver 610B of the second transceiver chip 601B may be aligned to an opposite first end 601B-a, as shown.

As similarly described throughout this disclosure above, the first and the second transceiver chips 601A and 601B may be directly connected via their respective aligned edge couplers, such that to create bidirectional optical paths between the first and the second transceiver chips 601A and 601B, as an example. As opposed to previous embodiments described herein above, the fourth embodiment shown in FIG. 6 comprises only a single bidirectional optical path, for example. As such, the transmitter 620A of the first transceiver chip 601A may be optically connected to the receiver 610B of the second transceiver chip 601B via the connected edge couplers 608A-a and 608C-b, as shown. Thus, the optically connected transmitter 620A and receiver 610B, respectively, may form a transmitter-receiver link 630 between the first and the second transceiver chips 601A and 601B. It should be understood that in order to test links for the receiver 610A of the first transceiver chip 601A and the transmitter 620B of the second transceiver chip 601B, a third and a fourth transceiver chips (not shown) may be connected (via edge couplers 608C-a and 608A-b, respectively, for example) to sides 601A-b and 601B-a, respectively, to form Tx-Rx links with receiver 610A and transmitter 620B, for example.

As similarly described throughout this disclosure above, the Tx and the Rx components of the first and the second transceiver chips 601A and 601B may be tested individually and/or via the links between the Tx and Rx components on the wafer level using the grating couplers shown in FIG. 6, for example. As described similarly above, in order to test the transmitter 620A of the first transceiver chip 601A, optical test signal 622A may be launched into grating coupler 605B-a and may subsequently be coupled out of the grating coupler 605A-a to be collected for EO conversion evaluation, for example. Then, in order to test the receiver 610A of the first transceiver chip 601A, optical test signal 621A may be launched into grating coupler 605C-a to be received by the receiver 610A, and thus to evaluate the OE conversion performance of the receiver 610A, for example. Finally, to test the Tx-Rx link 630 between the first transceiver chip 601A and the second transceiver chip 601B, optical test signal 624 may be launched into grating coupler 605B-a and may be propagated through the transmitter 620A and subsequently through the connected edge couplers 608A-a and 608C-b, as shown, to be received by the receiver 610B, as an example. As mentioned previously above when referring to FIG. 2, the performances of the transmitter 620A and the receiver 610B may be accomplished via on-chip electrical connections (via electrical pads 615A or 615B, for example) electrically connected to an external computer, for example.

Following the test of the first transceiver chip 601A, the second transceiver chip 601B may be tested following the same protocol as set forth above. Because the transmitter output and the receiver input are located on opposite sides of each chip 601A, 601B, as mentioned above, the grating couplers (e.g., 605A-a, 605A-b) of both chips are oriented to face in the same direction, as shown in FIG. 6. Thus, when switching the screening test from the first transceiver chip 601A to the second transceiver chip 601B, there is no need to rotate the wafer (on which the chips are disposed) by 180 degrees or change the incidence angles of the laser-connected fibers (array). The fibers or fiber arrays optically aligned with the test laser sources may thus simply be traversed longitudinally such that to align with the grating couplers 605A-b-605C-b, as needed to conduct the screening tests of the Tx and Rx components and link for the second transceiver chip 601B, for example. Upon alignment of the fibers or fiber arrays to the grating couplers of the second transmitter chip 601B, the transmitter 620B may be tested via optical test signal 622B being launched into grating coupler 605B-b, and the receiver 610B may be tested via optical test signal 621B being launched into grating coupler 605C-b, as shown. Thus, an advantage of the disclosed method is that wafer-level testing may be efficiently conducted for pairs of transceivers having only one pair of directly connected edge couplers.

As stated above, the fibers/fiber arrays optical alignment process when testing the coupled pair of transceiver chips 601A and 601B, as well as each coupled pair of transceiver chips on the wafer (not shown), may be simplified due to the placement of the Tx output and the Rx input on opposite sides of each chip. As such, the grating couplers of each chip are configured to face the same direction (vertically upwards in this example), and thus, each chip of the pair of chips is no longer needed to be rotated 180 degrees relative to the other. Thus, an advantage of the placement of the Tx output and the Rx input on opposite sides of the chip is the ease of optical alignment during testing since there is no need for rotating the wafer when switching between a pair of coupled transceiver chips. It should be understood that the coupled pair of the fourth embodiment of the transceiver chip disclosed herein may be provided as a plurality disposed across a wafer, as shown previously in FIG. 3. As such, each coupled pair of the fourth embodiment of the transceiver chip may be tested on the wafer in the manner described above using the grating couplers of each coupled pair of transceiver chips, for example. As such, those integrated transceiver chips having nonoperational/insufficient Tx or Rx components, as determined during wafer-level testing, will not be approved for product packaging after wafer dicing, as an example.

Figure 7:
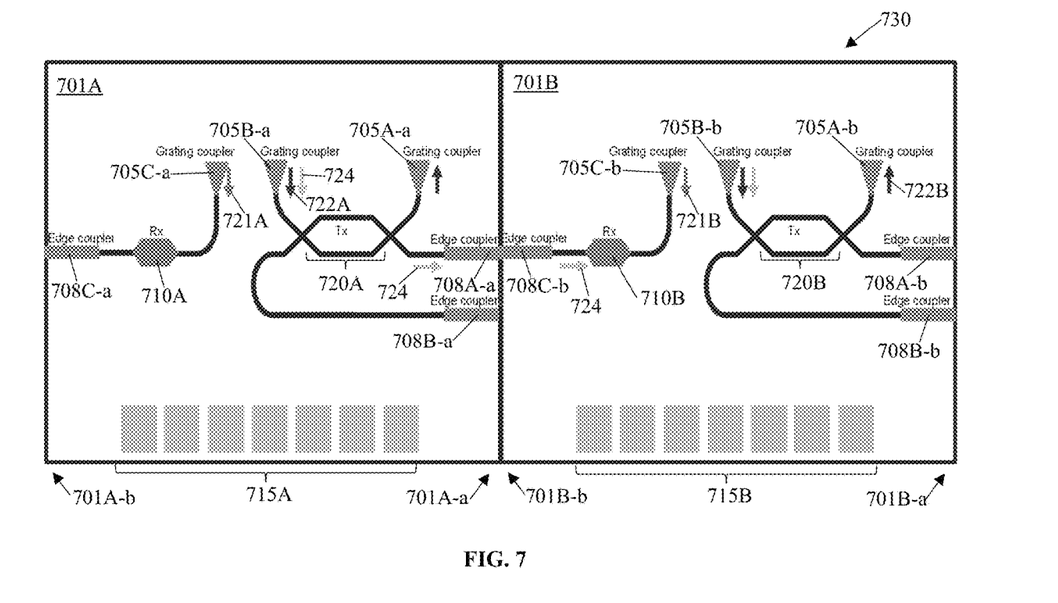
FIG. 7 is a diagram illustrating a top view of an exemplary layout for testing a transmitter-receiver link between a coupled pair of alternative embodiments of the integrated transceiver chip, according to an aspect.

FIG. 7 is a diagram illustrating a top view of a method of testing a transmitter-receiver link 730 between a coupled pair of alternative embodiments 701A and 701B of the integrated transceiver chip, according to an aspect. As mentioned previously above, the transceiver chip shown previously in FIG. 1 may be provided in an alternative embodiment, such that a pair of the alternative embodiments may form an alternative layout for the transmitter-receiver link shown previously in FIG. 2, for example. As will be discussed in detail below, the third embodiment of the transceiver chip shown previously in FIG. 5 may be alternatively formatted as a fifth embodiment and paired with another chip, such that to allow an easier wafer-level testing of the Tx and Rx components, as well as the testing of back-to-back Tx-Rx links, between pairs of the fifth embodiment, as an example.

As shown in FIG. 7, referring to a first and a second transceiver chips 701A and 701B, in comparison to the pairing shown previously in FIG. 5, the components of the first and the second transceiver chips 701A and 701B have been rearranged, such that to simplify the optical alignment process during testing. As an example, the edge couplers of each transceiver chip may again be alternatively arranged, such that the Tx output and the Rx input are on opposite sides of the chip, rather than being located on the same side of the chip, as described similarly above when referring to FIG. 6. As an example, the edge coupler 708C-a optically connected to the receiver 710A may be provided at a second end 701A-b of the first transceiver chip 701A. Additionally, the edge couplers 708A-a and 708B-a connected to the output and the input of the transmitter 720A, respectively, may be provided at a first end 701A-a of the first transceiver chip 701A, as opposed to the embodiment shown previously in FIG. 6. Similarly, as shown, the edge couplers 708A-b and 708B-b connected to the output and the input of the transmitter 720B, respectively, of the second transceiver chip 701B may be provided at a same first end 701B-a, such that the first and the second transceiver chip 701A and 701B are identical in layout and orientation, as shown. As above, the edge coupler 708C-b optically connected to the receiver 710B of the second transceiver chip 701B may be aligned to an opposite second end 701B-a, as shown as an example.

As similarly described throughout this disclosure above, the first and the second transceiver chips 701A and 701B may be directly connected via their respective aligned edge couplers, such that to create bidirectional optical paths between the first and the second transceiver chips 701A and 701B, as an example. Like the previous embodiment shown previously in FIG. 6, the fifth embodiment shown in FIG. 7 comprises only a single bidirectional optical path, for example. As such, the transmitter 720A of the first transceiver chip 701A may be optically connected to the receiver 710B of the second transceiver chip 701B via the connected edge couplers 708A-a and 708C-b, as shown. Thus, the optically connected transmitter 720A and receiver 710B may form a transmitter-receiver link 730 between the first and the second transceiver chips 701A and 701B. It should be understood that in order to test links for the receiver 710A of the first transceiver chip 701A and the transmitter 720B of the second transceiver chip 701B, a third and a fourth transceiver chips may be connected (via edge couplers 708C-a and 708A-b, respectively, for example) to sides 701A-b and 701B-a, respectively, to form Tx-Rx links with receiver 710A and transmitter 720B, for example.

As similarly described throughout this disclosure above, the Tx and the Rx components of the first and the second transceiver chips 701A and 701B may be tested individually and/or via the link 730 between the Tx and Rx components on the wafer-level using the grating couplers shown in FIG. 7, for example. As described similarly above, in order to test the transmitter 720A of the first transceiver chip 701A, optical test signal 722A may be launched into grating coupler 705B-a and may subsequently be coupled out of the grating coupler 705A-a to be collected for EO conversion evaluation, for example. Then, in order to test the receiver 710A of the first transceiver chip 701A, optical test signal 721A may be launched into grating coupler 705C-a to be received by the receiver 710A, and thus to evaluate the OE conversion performance of the receiver 710A, for example. Finally, to test the Tx-Rx link 730 between the first transceiver chip 701A and the second transceiver chip 701B, optical test signal 724 may be launched into grating coupler 705B-a and may be propagated through the transmitter 720A and subsequently through the aligned and connected edge couplers 708A-a and 708C-b, as shown, to be received by the receiver 710B, as an example. As mentioned previously above when referring to FIG. 2, the performances of the transmitter 720A and the receiver 710B may be accomplished via on-chip electrical connections (via electrical pads 715A or 715B, for example) electrically connected to an external computer, for example.

Following the test of the first transceiver chip 701A, the second transceiver chip 701B may be tested following the same protocol as set forth above. Because the transmitter output and the receiver input are located on opposite sides of each chip 701A, 701B, as mentioned above, the grating couplers (e.g., 705A-a, 705A-b) of both chips are oriented to face in the same direction, as shown in FIG. 7. Thus, when switching the screening test from the first transceiver chip 701A to the second transceiver chip 701B, there is no need to rotate the wafer (on which the chips are disposed) by 180 degrees or change the incidence angles of the laser-connected fibers (array). The fibers or fiber arrays optically aligned with the test laser sources may thus simply be traversed longitudinally such that to align with the grating couplers 705A-b-705C-b, as needed to conduct the screening tests of the Tx and Rx components for the second transceiver chip 701B, for example. Upon alignment of the fibers or fiber arrays to the grating couplers of the second transmitter chip 701B, the transmitter 720B may be tested via optical test signal 722B being launched into grating coupler 705B-b, and the receiver 710B may be tested via optical test signal 721B being launched into grating coupler 705C-b, as shown. Thus, an advantage of the disclosed method is that wafer-level testing may be efficiently conducted for pairs of transceivers having only one pair of directly connected edge couplers.

As stated above, the fibers/fiber arrays optical alignment process when testing the coupled pair of transceiver chips 701A and 701B, as well as each coupled pair of transceiver chips on the wafer (not shown), may be simplified due to the placement of the Tx output and the Rx input on opposite sides of each chip. As such, the grating couplers of each chip are configured to face the same direction (vertically upwards, per this example), and thus each chip of the pair of chips is no longer needed to be rotated 180 degrees relative to the other. Thus, an advantage of the placement of the Tx output and the Rx input on opposite sides of the chip is the ease of optical alignment during testing since there is no need for rotating the wafer when switching between a pair of coupled transceiver chips. It should be understood that the coupled pair of the fifth embodiment of the transceiver chip disclosed herein may be provided as a plurality disposed across a wafer, as shown previously in FIG. 3. As such, each coupled pair of the fifth embodiment of the transceiver chip may be tested on the wafer in the manner described above using the grating couplers of each coupled pair of transceiver chips, for example. As such, those integrated transceiver chips having nonoperational/insufficient Tx or Rx components, as determined during wafer-level testing, will not be approved for product packaging after wafer dicing, as an example.

Thus, an advantage of the disclosed wafer-level method of testing each of the embodiments of the transceiver chip is that the front to end process of testing, dicing, and packaging transceiver chips on a wafer is made more time efficient, simpler, and thus more effective. Another advantage of the disclosed transceiver chip is the ability to customize and rearrange the layout of the transceiver chip, such that to accommodate specific optical applications, for example, while maintaining the ability to test individual Tx and Rx components and Tx-Rx back-to-back links on a wafer level. An additional advantage is that, because of the increased efficiency in the testing process of transceiver chips on the wafer level, cost efficiency may be increased.

It should be understood that the various operations described herein above in connection with the methods of testing the various embodiments of the integrated transceiver chip may be performed manually (by a user) or autonomously (by the external computer). These operations include the launching the test optical signals using laser sources, the aligning of the fibers/fiber arrays to the grating couplers of the transceiver chips, the receiving of the output optical test signals, and the reading of the screen test results for the Tx and Rx components. It should be understood that the integrated transceiver chip shown and described herein may be provided in a plurality of additional embodiments not explicitly shown in the drawings, but which fall within the scope of the present invention. It should also be understood that the disclosed integrated transceiver chip may be implemented on various integrated photonics platforms, including, but no limited to, silicon, silicon-nitride, silica, lithium niobate, polymer, III-V materials, hybrid platforms, etc. The disclosed transceiver chip may be used with optical signals having various wavelength ranges, such as, for example, O, E, S, C, and L-band. It should be understood that the disclosed integrated transceiver chip and testing methods may be used for a wide variety of integrated photonics applications, such as, for example, optical communications, optical sensing, optical computing, automotive applications, quantum applications, etc.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

As used throughout this disclosure, the terms/phrases "optical signal," "optical test signal," "optical light," "laser light," "laser signal," and the like are used interchangeably. It should be understood that the aforementioned terms each individually and collectively refer to light, and more specifically, electromagnetic radiation.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An integrated transceiver chip comprising:
a plurality of bidirectional ports, each bidirectional port of the plurality of bidirectional ports being aligned to an edge of the integrated transceiver chip;
a plurality of grating couplers;
a receiver having a first and a second input ports, the first input port being optically connected to a first grating coupler of the plurality of grating couplers, and the second input port being optically connected to a first bidirectional port of the plurality of bidirectional ports; and
a transmitter having a first and a second input and a first and a second output ports, the first input port being optically connected to a second bidirectional port of the plurality of bidirectional ports and the second input port being optically connected to a second grating coupler of the plurality of grating couplers, and the first output port being optically connected to a third bidirectional port of the plurality of bidirectional ports and the second output port being optically connected to a third grating coupler of the plurality of grating couplers;
wherein the receiver is adapted to receive a first optical signal being launched into one of the first grating coupler and the first bidirectional port, and the transmitter is adapted to receive a second optical signal being launched into one of the second bidirectional port and the second grating coupler, the transmitter being further adapted to cause a transmitting of the second optical signal to one of the third grating coupler and the third bidirectional port.

2. The integrated transceiver chip of claim 1, further comprising an array of electrical pads aligned to an edge of the integrated transceiver chip, the array of electrical pads providing electrical contact means for the receiver and the transmitter.

3. The integrated transceiver chip of claim 1, wherein the plurality of bidirectional ports are edge couplers.

4. The integrated transceiver chip of claim 1, wherein the receiver is a P-I-N junction-based photodetector.

5. The integrated transceiver chip of claim 1, wherein the transmitter is a Mach-Zehnder Interferometer-based modulator.

6. The integrated transceiver chip of claim 5, wherein the input and output ports are 2×2 couplers.

7. The integrated transceiver chip of claim 1, wherein the first input port of the receiver is optically connected to the first grating coupler, and the second input port of the receiver is optically connected to the first bidirectional port, via optical channels.

8. The integrated transceiver chip of claim 7, wherein the first input port of the transmitter is optically connected to the second bidirectional port and the second input port of the transmitter is optically connected to the second grating coupler, and the first output port of the transmitter is optically connected to the third bidirectional port and the second input port of the transmitter is optically connected to the third grating coupler, via optical channels.

9. An assembly for wafer-level testing of transmitters and receivers of integrated transceiver chips disposed on a wafer, the assembly comprising at least one coupled pair of a first and a second integrated transceiver chips, the at least one coupled pair of a first and a second integrated transceiver chips comprising:
a plurality of first bidirectional ports each aligned to an edge of the first integrated transceiver chip, and a plurality of second bidirectional ports each aligned to an edge of the second integrated transceiver chip;
wherein at least one first bidirectional port of the plurality of first bidirectional ports and at least one second bidirectional port of the plurality of second bidirectional ports are optically aligned and connected;
a plurality of first grating couplers disposed on the first integrated transceiver chip, and a plurality of second grating couplers disposed on the second integrated transceiver chip; and
a first transmitter and a first receiver disposed on the first integrated transceiver chip, and a second transmitter and a second receiver disposed on the second integrated transceiver chip;
wherein one of the plurality of first grating couplers is optically connected to the first transmitter, the first transmitter being optically connected to one of the at least one first bidirectional ports aligned and optically connected to one of the at least one second bidirectional ports, the one of the at least one second bidirectional ports being optically connected to the second receiver, such that an optical link is established between the first transmitter of the first integrated transceiver chip and the second receiver of the second integrated transceiver chip.

10. The assembly of claim 9, wherein one of the plurality of second grating couplers is optically connected to the second transmitter, the second transmitter being optically connected to another of the at least one first bidirectional ports optically aligned and connected to another of the at least one second bidirectional ports, the another of the at least one second bidirectional ports being optically connected to the first receiver, such that an optical link is established between the second transmitter of the second integrated transceiver chip and the first receiver of the first integrated transceiver chip.

11. The assembly of claim 9, wherein, when an optical test signal is launched into the one of the plurality of first grating couplers, the optical test signal is propagated through the first transmitter, the optical test signal being propagated toward and optically traversed through the one of the at least one first bidirectional ports and the one of the at least one second bidirectional ports, the optical test signal subsequently being received by the second receiver, and thus resulting in wafer-level testing of the optical link between the first transmitter and the second receiver.

12. The assembly of claim 10, wherein, when an optical test signal is launched into the one of the plurality of second grating couplers, the optical test signal is propagated through the second transmitter, the optical test signal being propagated toward and optically traversed through the another of the at least one first bidirectional ports and the another of the at least one second bidirectional ports, the optical test signal subsequently being received by the first receiver, and thus resulting in wafer-level testing of the optical link between the second transmitter and the first receiver.

13. The assembly of claim 9, wherein the pluralities of first and second bidirectional ports are edge couplers.

14. The assembly of claim 9, wherein the pluralities of first and second grating couplers are oriented to be faced in the same direction.

15. The assembly of claim 9, wherein the plurality of first grating couplers are oriented to be faced in a first direction, and the plurality of second grating couplers are oriented to be faced in a second direction opposite the first direction.

16. A method of enabling wafer-level testing of a pair of a first and a second integrated transceiver chips disposed on a wafer, the pair of a first and a second integrated transceiver chips each comprising a transmitter and a receiver, the method comprising establishing a transmitter-to-receiver link between the first and the second integrated transceiver chips, the transmitter-to-receiver link being established by:
- providing a plurality of bidirectional ports on each of the first and the second integrated transceiver chips, wherein at least a first and a second bidirectional ports of each of the first and the second integrated transceiver chips, respectively, are optically aligned and connected;
- providing a plurality of grating couplers on each of the first and the second integrated transceiver chips, wherein a first grating coupler is optically connected to a first transmitter of the first integrated transceiver chip, and a second grating coupler is optically connected to a second transmitter of the second transceiver chip;
- optically connecting the first transmitter to the first bidirectional port; and
- optically connecting a second receiver of the second integrated transceiver chip to the second bidirectional port, such that to establish a transmitter-to-receiver link between the first transmitter and the second receiver, the transmitter-to-receiver link enabling wafer-level testing of the first and the second transceiver chips.

17. The method of claim 16, wherein the transmitter-to-receiver link is further established by:
- optically connecting a second transmitter of the second integrated transceiver chip to a third bidirectional port of the plurality of bidirectional ports of the second integrated transceiver chip, the third bidirectional port being optically aligned and connected to a fourth bidirectional port of the plurality of bidirectional ports of the first transceiver chip; and
- optically connecting a first receiver of the first integrated transceiver chip to the fourth bidirectional port, such that to establish a transmitter-to-receiver link between the second transmitter and the first receiver.

18. The method of claim 17, further comprising:
- aligning a laser source to the first grating coupler of the first transceiver chip;
- operating the laser source, such that a first optical test signal is launched into the first grating coupler, the optical test signal being propagated through the first transmitter and subsequently through the first bidirectional port, the optical test signal propagating through the aligned and optically connected second bidirectional port, and thus into the second receiver, resulting in the wafer-level testing of the first and the second integrated transceiver chips via the transmitter-receiver link;
- aligning the laser source to the second grating coupler of the second transceiver chip; and
- operating the laser source, such that a second optical test signal is launched into the second grating coupler, the second optical test signal being propagated through the second transmitter and subsequently through the third bidirectional port, the second optical test signal propagating through the aligned and optically connected fourth bidirectional port, and thus into the first receiver, resulting in the wafer-level testing of the second and the first integrated transceiver chips via the transmitter-receiver link.

19. The method of claim 16, wherein the plurality of grating couplers of each of the first and the second integrated transceiver chips are oriented to be faced in the same direction.

20. The method of claim 16, wherein the plurality of grating couplers of the first integrated transceiver chip are oriented to be faced in a first direction, and the plurality of grating couplers of the second integrated transceiver chip are oriented to be faced in a second direction opposite the first direction.

* * * * *